(12) United States Patent
Kim et al.

(10) Patent No.: US 7,139,475 B1
(45) Date of Patent: Nov. 21, 2006

(54) RING TYPE FIBER OPTIC PROTECTION

(75) Inventors: Chang H. Kim, Whippany, NJ (US);
Kwang S. Kim, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/573,563

(22) Filed: May 19, 2000

(51) Int. Cl.
*H04J 14/02* (2006.01)

(52) U.S. Cl. .......................... 398/5; 398/154; 398/398; 398/155

(58) Field of Classification Search ................ 359/110; 398/1–4, 20, 22, 5, 154, 155, 202, 210
See application file for complete search history.

(56) References Cited

U.S. PATENT DOCUMENTS

| | | | | |
|---|---|---|---|---|
| 4,306,313 | A | * | 12/1981 | Baldwin ..................... 359/177 |
| 4,451,916 | A | * | 5/1984 | Casper et al. ................. 714/4 |
| 5,229,875 | A | * | 7/1993 | Glista ........................... 398/4 |
| 6,317,414 | B1 | * | 11/2001 | Naohiro ..................... 370/222 |

\* cited by examiner

*Primary Examiner*—Jason Chan
*Assistant Examiner*—David C. Payne

(57) ABSTRACT

An optical receiver is provided with inputs for receiving two fiber optic lines. The two fiber optic lines carry redundant data. An optical interface passes the respective signals therein to a comparison unit. The comparison unit compares the signals and determines which has the better quality and passes the better quality signal on to a processing interface. Clock data for operating the comparison unit is extracted from the optical signals.

6 Claims, 4 Drawing Sheets

RING TYPE FIBER OPTIC PROTECTION

BACKGROUND OF THE INVENTION

1. Field of the Invention

The present invention relates to a system for providing data protection in ring type networks and other networks. The present invention also relates to a redundant receiver architecture for use in a fiber optic transmission system.

2. Description of the Related Art

A basic point-to-point fiber optic transmission system consists of three basic elements: the optical transmitter, the fiber optic cable and the optical receiver. The optical transmitter converts an electrical analog or digital signal into a corresponding optical signal. The optical receiver converts the optical signal back into a replica of the original electrical signal.

Optical signals generally undergo a 0.2 dB loss per kilometer when transmitted over a fiber optic channel. This translates to a 4% loss of the light regardless of modulation. Since the receiver signal can be quite small, receivers often employ high gain internal amplifiers. FIG. 1 is a functional diagram of a known simple analog optical receiver. The first stage 1 is an operational amplifier connected as a current-to-voltage converter. This stage takes the tiny current from the photodiode 2 and converts it into a voltage, usually in the millivolt range. The next stage 3 is a simple operational voltage amplifier in which the signal is raised to the desired output level 4.

FIG. 2 is a functional diagram of a simple digital optical receiver. As in the case of the analog receiver, the first stage 1 is a current-to-voltage converter. The output of this stage, however, is fed to a voltage comparator 10, which produces a clean, fast rise-time digital output signal. The trigger level adjustment 11, when it is present, is used to touch up the point on the received signal where the comparator 10 switches. This allows the symmetry of the recovered digital signal to be trimmed as accurately as desired. Additional stages may be added to receivers to provide drivers for coaxial cables, protocol converters or a host of other functions in efforts to reproduce the original signal as accurately as possible.

When a signal is compared to a reference voltage, however, the system does not guarantee that information is in fact received. That is, the receiving device must ultimately detect the presence of missing information and determine how to obtain it. Accordingly, to handle missing information, redundant transmission of data over the same fiber optic channel is typically employed. This causes delays in data transmission and adds to the complexity of the transmission and reception equipment.

SUMMARY OF THE INVENTION

The present invention uses a redundant fiber optic receiver to overcome problems associated with data losses in an optical fiber system. The fiber system may be a ring type optical fiber network, for example. Thus, an optical receiver is provided that has a pair of inputs for receiving two separate fiber optic lines. The two fiber optic lines carry redundant data. That is, the same data is present in both fiber optic lines. An optical interface receives the two fiber optic lines and passes the signal therein to a photo detection unit.

The photo detection unit is combined with a clock recovery module and an automatic gain control. The signals received from the two fiber optic lines are synchronized and compared. A comparator is used to determine which of the compared received signals is the better signal, and the better signal is then passed on to the processing interface. The present invention may use a magnitude comparison to select the received signal that has the larger magnitude, for example.

The present invention may be employed in a fiber optic network (such as a local or office network). The invention may be especially applicable in a network where redundant fibers are used to maintain the desired reliability and data protection. Such fibers may experience different attenuation for various reasons. The present invention may be used to provide a relatively uncomplicated and easy-to-implement system for accommodating such different attenuation while maintaining the desired reliability and data protection.

Thus, in a preferred embodiment of the invention, two redundant optical channel signals are received by one or more photo detectors. The signals are amplified separately and filtered to remove high frequency noise. Then the signals are amplified a second time by an automatic gain control (AGC) device. The AGC device may use the better of the two signals to calculate gain. Since only a single AGC device is used, the signals from the second amplifiers are different from each other. The two signals are applied to separate pairs of integrate/dump and compare/latch circuits, and the better one is applied to a first-in-first-out circuit. Note that the present invention should not be limited to the preferred embodiments shown and described in detail herein.

BRIEF DESCRIPTION OF THE DRAWINGS

The foregoing and other advantages and features of the invention will become more apparent from the detailed description of preferred embodiments of the invention given below with reference to the accompanying drawings in which.

DETAILED DESCRIPTION OF PREFERRED EMBODIMENTS

An optical receiver is provided that has a pair of inputs for receiving two fiber optic lines, each of which carries the same optical signal, i.e. redundant data. The two inputs can be selectively used to ensure data transmission is not interrupted or corrupted. An optical interface receives signals from the two lines and passes the signals to a photo detection unit, which is coupled to a clock recovery module and an automatic gain control circuit.

The respective data signals from the redundant lines may be synchronized. A comparator is used to determine which of the two synchronized data signals best represents the intended signal and the best data signal of the two is then passed on to the processing interface. The direct comparison of two data signals and the selection of the better signal assists in minimizing transmission losses and ensuring that the data is transferred in a complete and accurate manner.

Figure 1:
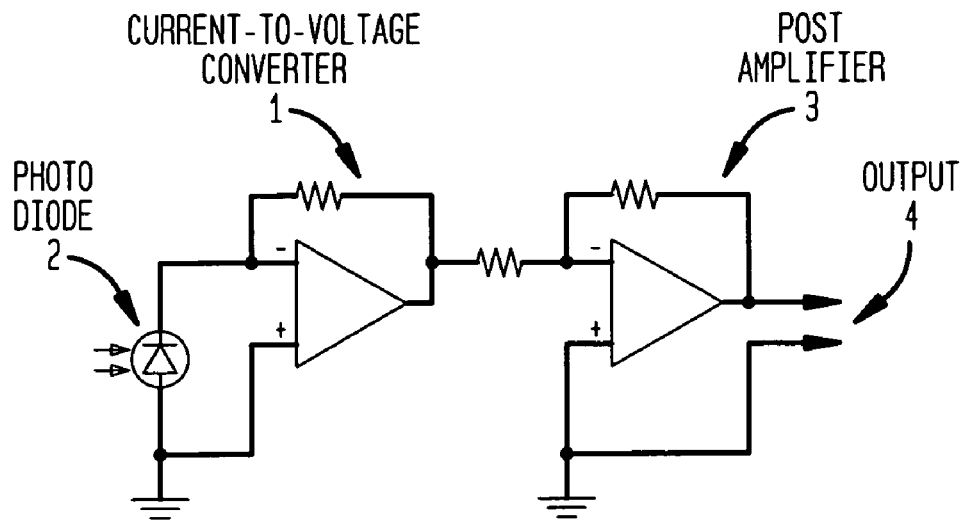
FIG. 1 is a functional diagram of a known simple analog optical receiver.
Figure 2:
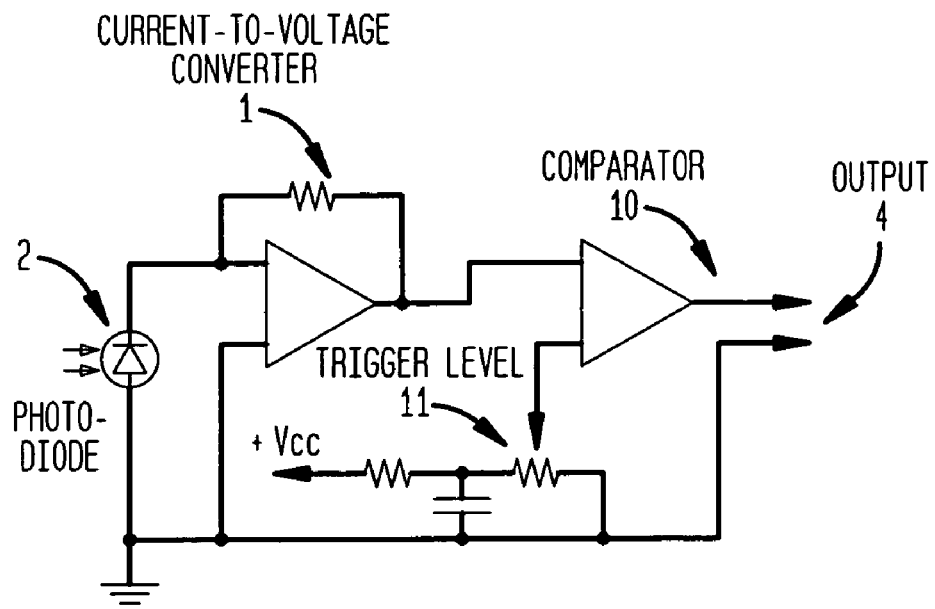
FIG. 2 is a functional diagram of a known simple digital optical receiver.
Figure 3:
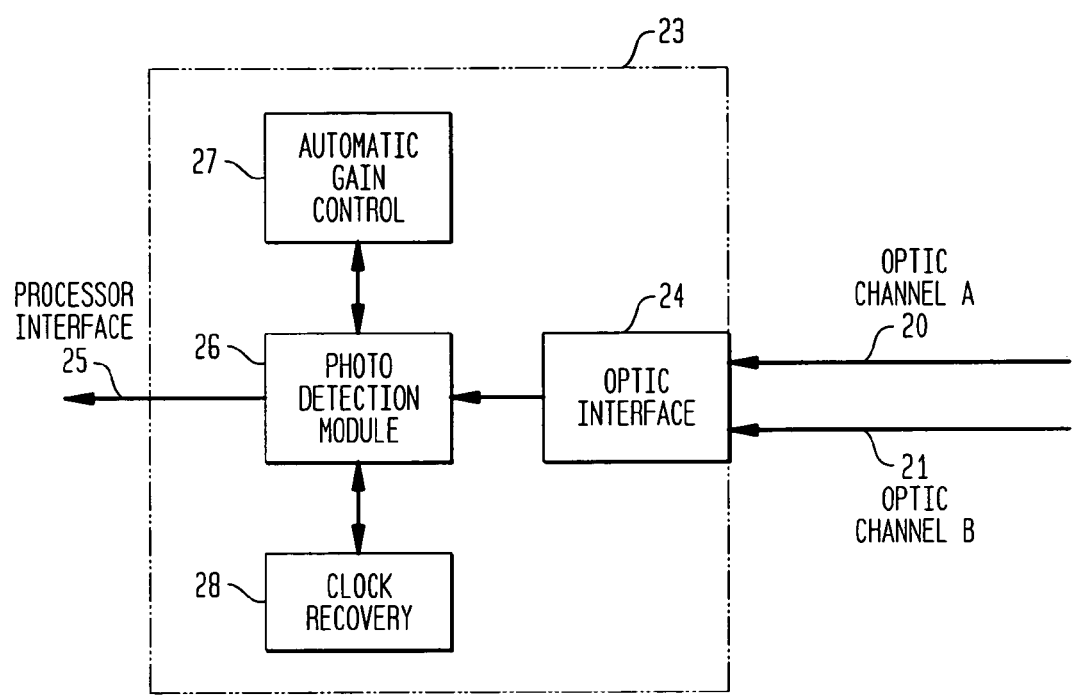
FIG. 3 is a schematic diagram of a redundant fiber optic receiver.

One embodiment of the present invention is shown in FIG. 3. A first optical channel 20 and a second optical channel 21 are provided. The illustrated embodiment assumes that the first and second channels 20, 21 are capable of transmitting data that is synchronized when it reaches the receiver 23. Those of ordinary skill in the art will recognize that there are multiple ways of synchronizing two different data sources and thus the present invention is not limited to the specific details of synchronizing the data in the two channels 20, 21.

The synchronized data is received by an optical interface 24 which converts the optical signals to electric signals. Those of ordinary skill in the art will recognize that any suitable optical/electric converter can be used. The two received signals are passed to a photo detection module 26 that is in turn connected to an automatic gain control module 27 and a clock recovery module 28. Only one of the received signals exits as an output signal 25.

The output signal 25 is based on the selected incoming signal, based on maximum voltage, for example. A magnitude comparator may be used to determine which of the compared signals has the greater magnitude and should therefore be selected as the single output signal 25. Accordingly, output signal 25 will be composed of the best portions of the data carried by the first optical channel 20 and the second optical channel 21.

Figure 4:
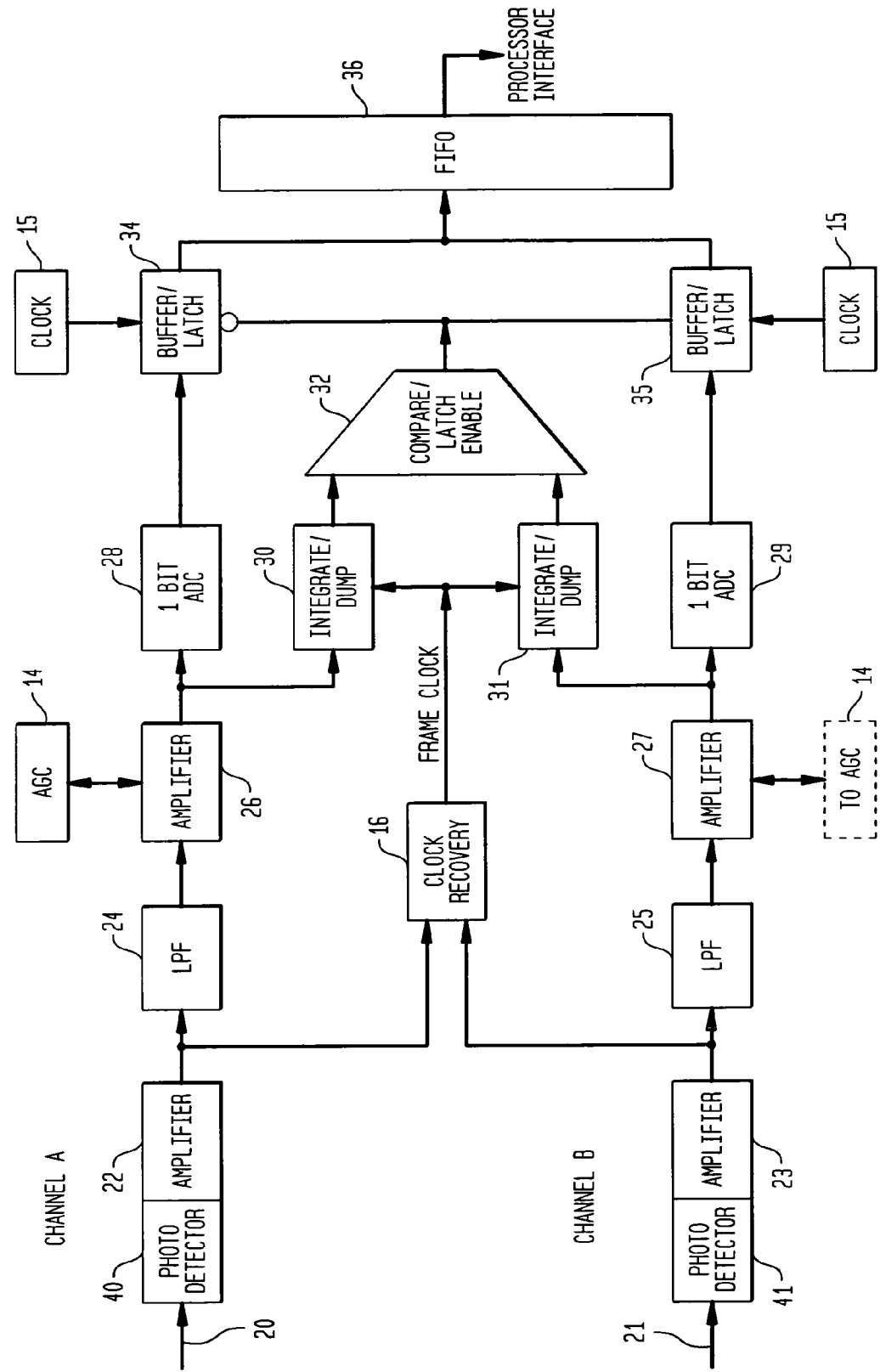
FIG. 4 is another diagram of the receiver of FIG. 3.

As shown in FIG. 4, each fiber optic channel 20, 21 may be connected to receivers that are in turn connected by a compare/latch enable circuit 32 which is used to select the best available data from the two channels 20, 21. The compare/latch enable circuit 32 operates to identify or determine which one of the illustrated buffer/latch circuits 34, 35 should be enabled.

In operation, the input signals on the fiber optic channels 20, 21 are received by respective photo detectors 40, 41. The photo detectors 40, 41 are connected to respective amplifiers 22, 23, which are, in turn, connected to a common clock recovery circuit 16. Clock data is buried in the signals carried on the input lines 20, 21. The clock recovery circuit 16 extracts the clock data from the transmitted signals.

In particular, the clock recovery circuit 16 is used to extract frame clock data for use in the comparison stage. The frame clock data is used to signal the integration start and dump time periods for the illustrated integrate/dump circuits 30, 31. The clock data is also supplied to the buffer/latch units 34, 35, as discussed in more detail below.

The first amplifiers 22, 23 are connected to respective low pass filters 24, 25 and from there to respective second amplifiers 26, 27. The second amplifiers 26, 27 are connected to a common automatic gain control (AGC) circuit 14. The AGC circuit 14 provides the same gain to both amplifiers 26, 27. In a preferred embodiment of the invention, the AGC circuit 14 monitors the better signal and determines and applies the desired gain to both second amplifiers 26, 27 based on that signal.

The outputs of amplifiers 26, 27 are connected to respective integrate/dump circuits 30, 31 and to respective one bit analog-to-digital converters (ADCs) 28, 29. The ADCs 28, 29 include comparators to resolve signals from the amplifiers 26, 27 into digital (0 or 1) data. The one bit ADCs 28, 29 are connected to the respective buffer/latch switches 34, 35 which are, in turn, connected to a clock circuit 15. The clock circuit 15 represents the clock data obtained from the clock recovery circuit 16. The clock circuit 15 operates to clock in the information data from the ADCs 28, 29 to the buffer/latch circuits 34, 35.

The integrate/dump circuits 30, 31 receive respective signals from the second amplifiers 26, 27. In addition, the circuits 30, 31 receive frame clock information from the clock recovery circuit 16 for use in controlling the integration function. The integrate/dump circuits 30, 31 are connected to a common compare/enable latch switch circuit 32 which compares the magnitudes of the two data signals and enables one of the buffer/latch switches 34, 35 to latch the data signal which has the larger magnitude.

The enabled switch 34, 35 feeds a first-in-first-out (FIFO) register 36. The register 36 in turn outputs the selected data to a processor interface. Thus, the enable circuit 32 enables either the first or the second buffer/latch switch 34, 35, whichever has the better signal, to transmit data to the FIFO 36. This way, the FIFO 36 receives a data stream from either the first buffer/latch switch 34 (i.e. from the first channel 20) or from the second buffer/latch switch 35 (i.e. from the second channel 21).

Granularity in the illustrated system can be adjusted from bit to frame (multiple of bits) level as desired.

The present invention may use a magnitude comparator to select the signal that has the larger magnitude. As an alternative arrangement, the two redundant data signals may be correlated and the correlation used to pass a signal which is the additive or other combination of the two data signals. Any other comparison method that assists in passing a signal with the maximum available information can also be used. It is also expressly contemplated that the redundant receiver may be selectively operative so that in one mode of operation one or the other of the received data signals can simply be passed through to the output on a selective basis (by selectively enabling the operative elements in only one receiver channel of FIG. 4), while in another mode the comparison of the redundant data and passing of a best signal or a combination of the redundant signals can occur in the manner described above.

Figure 5:
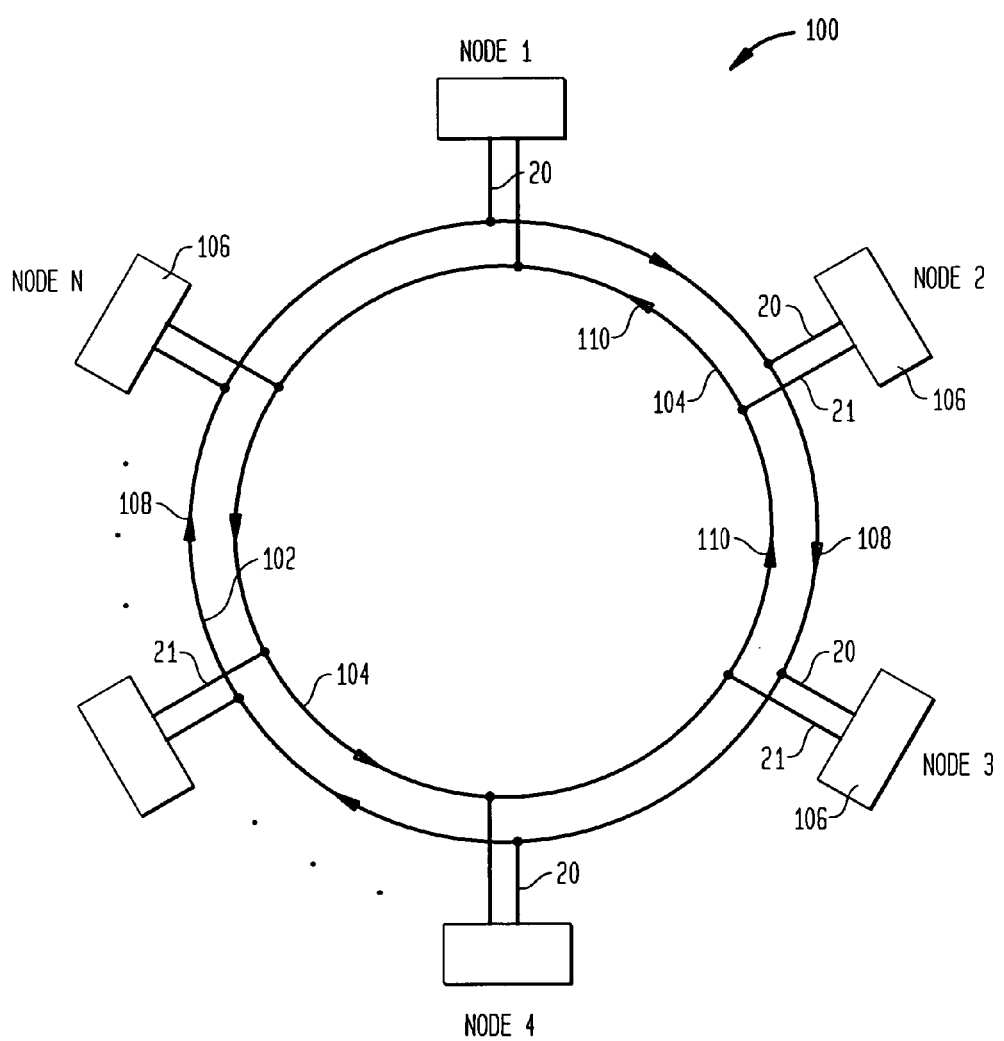
FIG. 5 illustrates a ring type network constructed in accordance with one embodiment of the present invention.

Referring now to FIG. 5, there is shown a network 100 constructed in accordance with the present invention. The network 100 includes parallel fiber optic transmission lines 102, 104. The transmission lines 102, 104 are connected to nodes 106 (nodes 1, 2, 3, 4 . . . n) by respective fiber optic input lines 20, 21. Signals are propagated through the transmission lines 102, 104 in opposite directions as indicated by arrows 108, 110. Each node 106 may include a signal receiver of the type shown in FIGS. 3 and 4. It should be understood, however, that the present invention is not limited to the preferred embodiments shown and described in detail herein.

While the invention has been described in detail in connection with the preferred embodiments know at the time, it should be readily understood that the invention is not limited to such disclosed embodiments. Rather, the invention can be modified to incorporate any number of variations, alterations, substitutions or equivalent arrangements not heretofore described, but which fall within the spirit and scope of the invention. Accordingly, the invention is not to be seen as limited by the foregoing description, but is only limited by the scope of the appended claims.

What is claimed as new and desired to be protected by Letters Patent of the United States is:

1. A redundant fiber optic system comprising:
   a clock recovery circuit for generating clock signals from redundant data received by at least first and second optical channels; and
   an analyzing circuit for analyzing said redundant data and for providing an output signal derived from at least one of the redundant data based on the result of said analysis, wherein said analyzing circuit is a comparator which compares said redundant data and said output signal is selected as one of the compared redundant data which has a better predetermined signal characteristic, wherein said redundant data is synchronized redundant data;

a photo detector;

a first amplifier having an input coupled to an output of said photo detector;

a low pass filter having an input coupled to an output of said first amplifier;

a second amplifier having an input coupled to an output of said low pass filter; and an analog-to-digital converter having an input coupled to an output of said second amplifier.

2. The system of claim 1, wherein said analyzing circuit further comprises an automatic gain control circuit coupled to said second amplifier.

3. The system of claim 1 further comprising a photo detector for said second fiber optic channel.

4. A redundant fiber optic system comprising:

a clock recovery circuit for generating clock signals from redundant data received by at least first and second optical channels; and an analyzing circuit for analyzing said redundant data and for providing an output signal derived from at least one of the redundant data based on the result of said analysis, wherein said analyzing circuit is a comparator which compares said redundant data and said output signal is selected as one of the compared redundant data which has a better predetermined signal characteristic, wherein said redundant data is synchronized redundant data, wherein said comparator comprises:

a first integrate and dump circuit having a first input coupled to an output of a first fiber optic receiver and a second input coupled to an output of said clock recovery circuit;

a second integrate and dump circuit having a first input coupled to an output of a second fiber optic receiver and a second input coupled to an output of said clock recovery circuit; and a compare/latch enable circuit having an input coupled to respective outputs of said first and second integrate and dump circuits, for comparing redundant data received by said first and second fiber optic receivers and providing a latch enable control signal in accordance with the result of said comparison.

5. The system of claim 4, further comprising:

a first buffer/latch having an input coupled to a data output of said first fiber optic receiver;

a second buffer/latch having an input coupled to a data output of said second fiber optic receiver;

said latch enable control signal enabling one of said first and second buffer/latches in accordance with the result of said comparison; and a buffer for assembling output data from the outputs of said first and second buffer/latches.

6. The system of claim 5, wherein said buffer/latch is a first-in-first out buffer/latch.

\* \* \* \* \*